Feb. 26, 1946. G. V. PEARSON 2,395,640
MULTIPLE WHEEL SUSPENSION FOR VEHICLES
Filed March 5, 1945 3 Sheets-Sheet 1
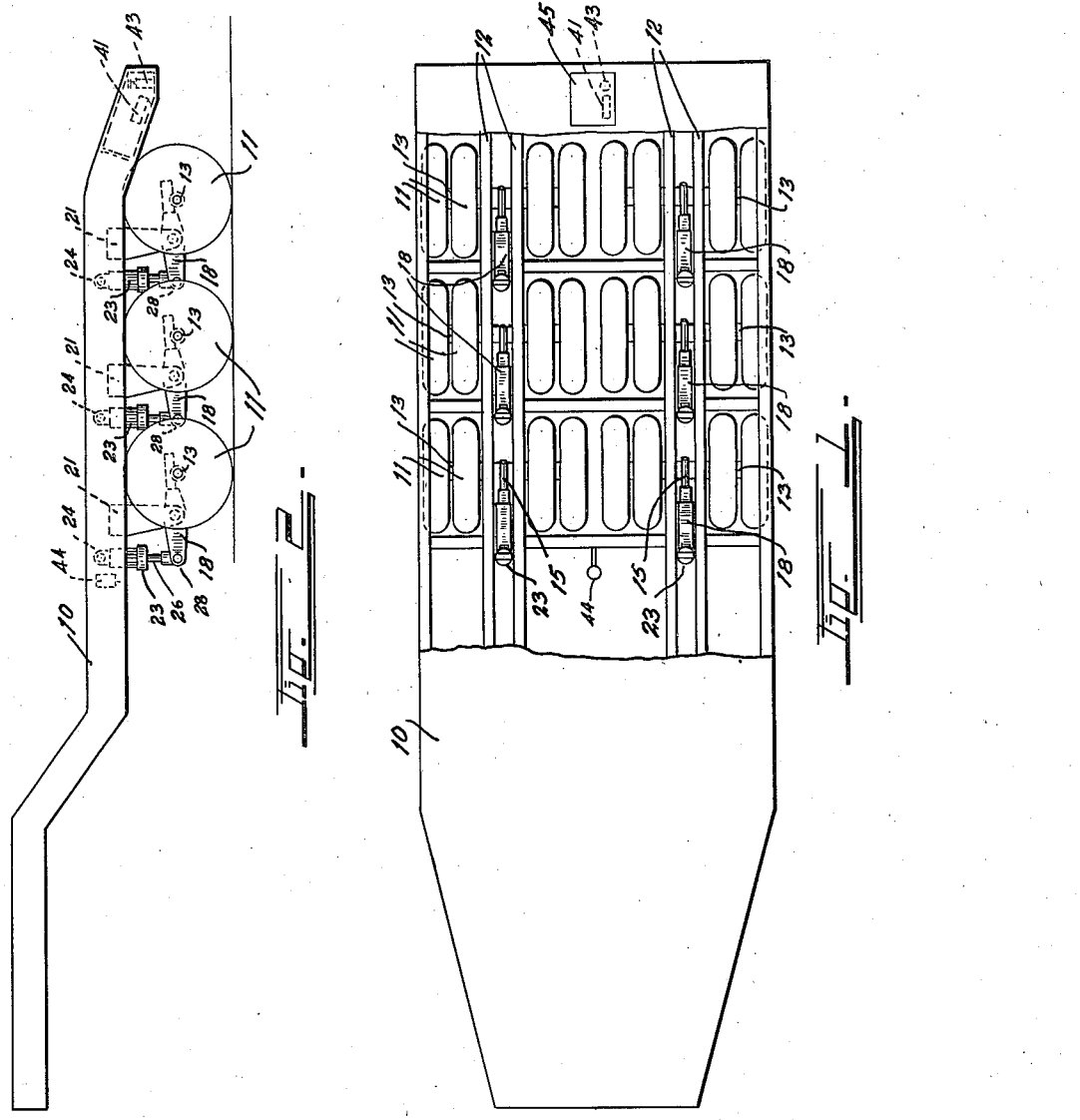
INVENTOR.
GEORGE V. PEARSON.
BY
ATTORNEY.

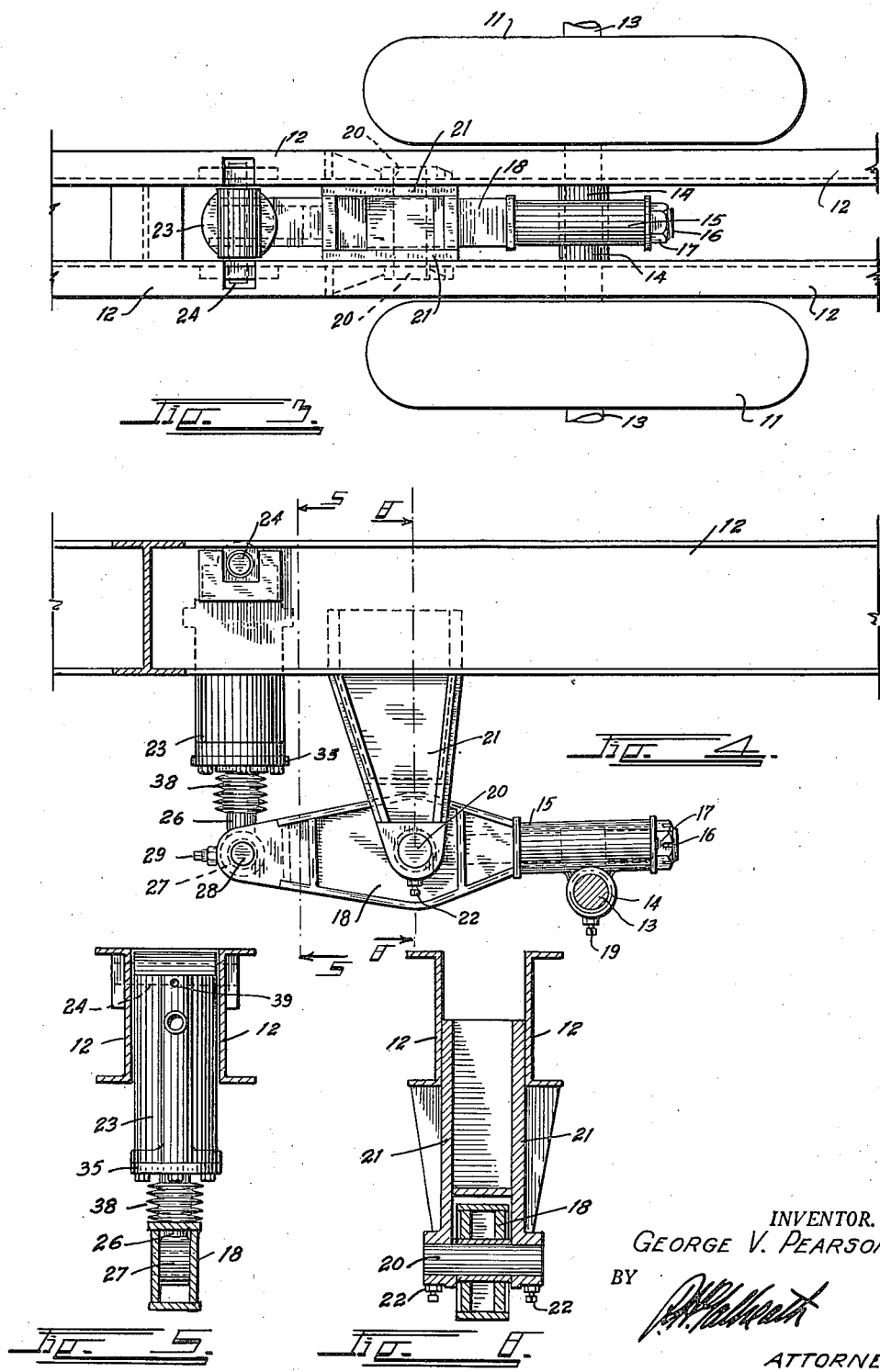

Feb. 26, 1946. G. V. PEARSON 2,395,640
MULTIPLE WHEEL SUSPENSION FOR VEHICLES
Filed March 5, 1945 3 Sheets-Sheet 3
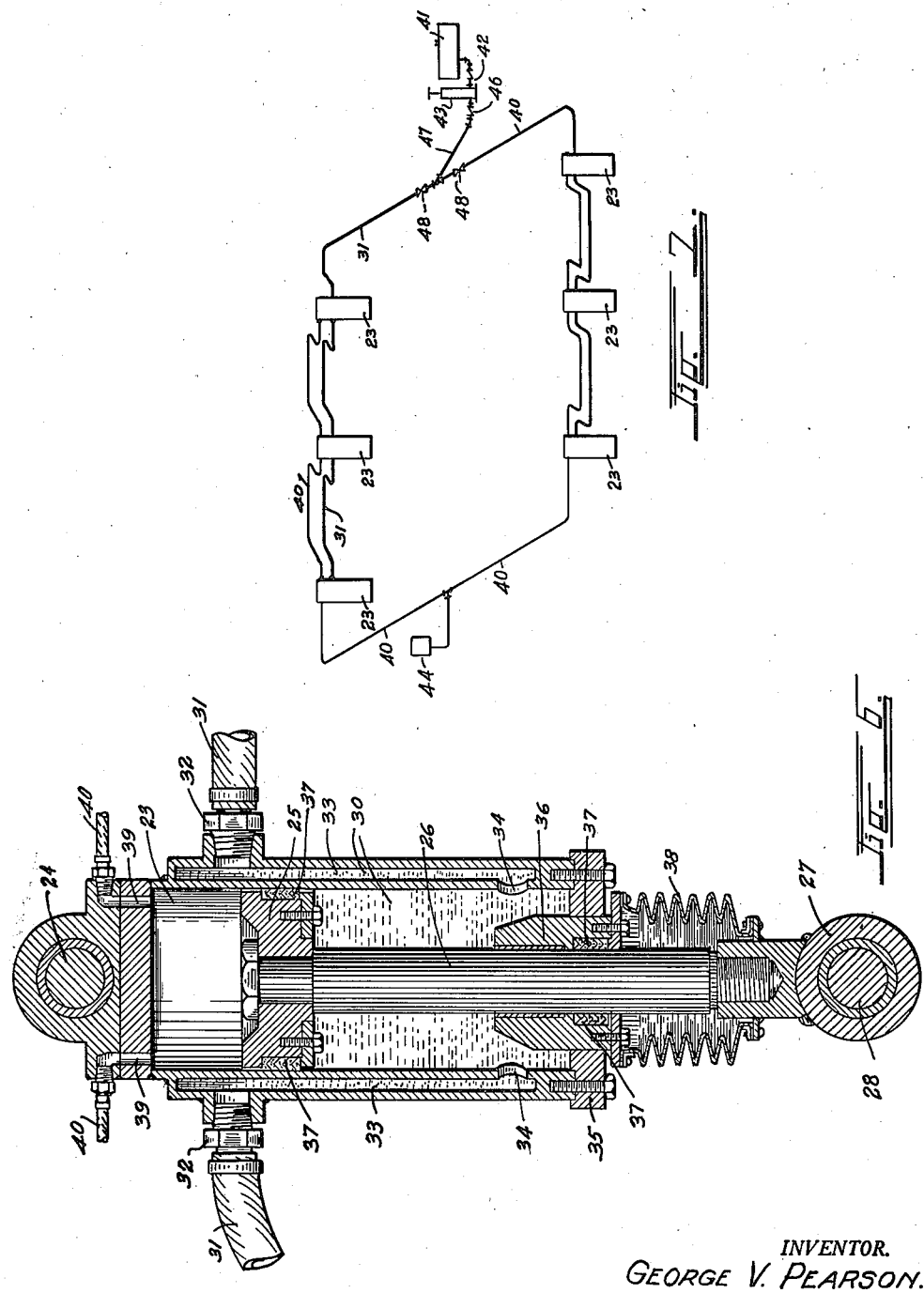
INVENTOR.
GEORGE V. PEARSON.
BY
ATTORNEY.

Patented Feb. 26, 1946

2,395,640

UNITED STATES PATENT OFFICE 2,395,640

MULTIPLE WHEEL SUSPENSION FOR VEHICLES

George V. Pearson, Denver, Colo.

Application March 5, 1945, Serial No. 581,083

9 Claims. (Cl. 280—81)

This invention relates to a multiple wheel suspension for vehicles. It is more particularly designed for exceedingly heavy semi-trailer constructions for use in transporting unusually heavy loads such as army tanks, weighing from thirty to fifty tons. For such work a large number of supporting wheels are required to carry the load. Trailers with from sixteen to thirty-two wheels are in frequent use. With this large number of wheels it has been exceedingly difficult to obtain a uniform distribution of load over all of the tires, for some of the wheels are of necessity resting on higher ground than others, and the former wheels assume a greater proportion of the load than the latter wheels.

The principal object of this invention is to provide a wheel suspension which will automatically distribute the total load evenly and uniformly to all of the supporting wheels regardless of unevenness or irregularities in the supporting terrain.

A further object is to accomplish the above without the use of springs with their liability of breakage.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:

Fig. 1 is a plan view of a typical heavy, semi-trailer truck with the deck thereof partially broken away to illustrate the position of the supporting wheels;

Fig. 2 is a side view thereof;

Fig. 3 is an enlarged plan view illustrating a connection between a wheel mounting member and the truck;

Fig. 4 is a side view of the mounting of Fig. 3;

Fig. 5 is a detail, vertical section, taken on the line 5—5, Fig. 4;

Fig. 6 is an enlarged, vertical section through one of the load distributing cylinders employed in the improved suspension; and Fig. 7 is a diagrammatic view illustrating the hydraulic connections of the mounting.

Fig. 8 is a detail vertical section taken on the line 8—8, Fig. 4.

A typical heavy semi-trailer truck is indicated at 10, supported upon twenty-four wheels 11 mounted in sets of four. Each set of four wheels and its mounting mechanism is similar to that of the other sets. The chassis of the truck 10 employs two pairs of longitudinally-extending wheel beams 12.

Each wheel mounting device includes a wheel axle 13 secured at its middle in a tubular supporting sleeve 14 by means of a suitable set screw 19. The axle 13 extends oppositely outward from the extremities of the sleeve 14 to provide the mounting axle for receiving two of the wheels 11 at each side of the sleeve. The sleeve 14 is formed integrally with a second pivot sleeve 15 positioned across the sleeve 14 and at right angles thereto. The pivot sleeve 15 is rotatably mounted on a stub shaft 16 and is held in place thereon by means of a suitable retaining nut 17. The two unitary sleeves 14 and 15 form a universal mounting member for the axle 13.

The stud is formed on and projects from a rocking member 18. A shaft 20 extends through the rocking member 18 and projects from the opposite sides thereof into shaft openings in a pair of pedestal members 21. One of the pedestal members extends downwardly from each of the beams 12 on opposite sides of the rocking member 18. The shaft 20 is locked in the pedestal members by means of suitable set screws 22.

It can be seen that the weight of the beams 12 is transferred to the medial portion of the rocking member 18 and tends to push the free extremity of this member downwardly. Downward movement of the latter extremity is hydraulically resisted, there being a hydraulic cylinder 23 suspended from a hinge shaft 24 extending between the beams 12 with a piston 25 slidably mounted therein. A piston rod 26, terminating in an eye fitting 27, extends downwardly from the piston 25. A pivot pin 28 passes through the free extremity of the rocking member 18 and through the eye fitting 27 and is locked in position by means of a set screw 29.

The cylinder 23, below the piston 25, is filled with suitable hydraulic fluid 30. All of the cylinders 23 are connected together in series by means of flexible hydraulic hoses 31. The hoses 31 terminate in suitable nipples 32 which are connected to fluid passages 33 formed on the opposite sides of each cylinder 23. Fluid ports 34 communicate between the lower extremities of the passages 33 and the interior of the cylinders 23. The lower extremity of each of the cylinders 23 is closed by means of a cylinder head 35 having a guide bearing 36 for guiding the rod 26, and suitable packing 37 for preventing leakage around the rod. A flexible, accordion-pleated shield 38 surrounds the projecting portion of the rod 36 to shield it against dirt, grit, and other foreign material.

The upper extremity of each cylinder 23 is provided with a pair of breather ports 39. Flexible bleed tubes 40 extend between the ports 39 of all of the cylinders and terminate in any suitable automotive type air cleaner 44 through which clean breather air is supplied to all cylinders.

A reservoir 41 and a manual force pump 43 are provided at any convenient point on the truck, such as below a removable floor plate 45. The reservoir is for the purpose of supplying hydraulic fluid to the pump 43 for filling the system and for replacing any leakage. A first check valve 42 is placed between the pump and the reservoir. The fluid from the pump flows through a second check valve 46 to a supply line 47, which terminates in two control valves 48. The hydraulic hoses 31 supplying the cylinders 23 at one side of the truck are connected to one of the valves 48, while the other valve 48 controls the supply to the cylinders on the other side thereof.

In use, the pump 43 is operated either manually or by power to force hydraulic fluid into all of the cylinders 23 until all of the rocking members 18 are brought to a substantially horizontal position when the wheels are upon a level surface. After the cylinders have been once filled to the desired point, the operation is thereafter automatic. Should a pair of adjacent wheels 11 of any set enter a depression in the ground, the axle 13 of that set will tilt, the sleeve 14 rotating on the stub shaft 16, and one-half of the downward movement of the said pair of wheels will be transmitted to the rocking member 18. Should the four wheels of any set move downwardly into a depression, the full movement will be transmitted to the rocking member 18. In either event the movement will cause its piston 25 to move upwardly in its cylinder. This immediately lessens the pressure on the hydraulic fluid therein, allowing additional fluid to enter from the other cylinders along that side of the vehicle until the pressure in all cylinders along that side is again uniform. Should any of the wheels strike a raised surface, this will tend to force the piston of that set of wheels downwardly. This instantly increases the pressure in the cylinder of that set so as to force the fluid therefrom into the other cylinders until the pressure in all cylinders is again equalized. Thus, at all times and on all types of surface conditions, the load pressure on every pair of dual tires will be equal.

While the invention has been described as particularly applicable to a semi-trailer vehicle it is, of course, not limited to this use but will apply to any wheeled vehicle of any size, capacity, or type and having any number of wheels nor is the invention limited to the particular side of the piston on which the hydraulic fluid is placed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A wheel mounting for multiple wheel vehicles comprising: a plurality of sets of wheels, there being an even number of wheels in each set; an axle extending between all of the wheels of each set; a mounting member on each axle intermediate the extremities thereof; a rocking member extending at right angles to said axle and parallel to the axis of said truck; a stub shaft on said rocking member upon which said mounting member is rotatably mounted; pedestal means extending downward from said vehicle; means for tiltably mounting said rocking member intermediate its extremities on said pedestal means so that it will project both forwardly and rearwardly thereof; a hydraulic cylinder; a piston in said cylinder; and means for transmitting the down-thrust of the free extremity of the rocking member to said piston.

2. A wheel mounting for multiple wheel vehicles comprising: a plurality of sets of wheels, there being an even number of wheels in each set; an axle extending between all of the wheels of each set; a mounting member on each axle intermediate the extremities thereof; a rocking member extending at right angles to said axle and parallel to the axis of said truck; a stub shaft on said rocking member upon which said mounting member is rotatably mounted; pedestal means extending downward from said vehicle; means for tiltably mounting said rocking member intermediate its extremities on said pedestal means so that it will project both forwardly and rearwardly thereof; a hydraulic cylinder; a piston in said cylinder; and means for transmitting the down-thrust of the free extremity of the rocking member to said piston, a conduit connecting the cylinders of the sets of wheels together so as to equalize the pressure in all cylinders.

3. A wheel mounting for multiple wheel vehicles comprising: a plurality of sets of wheels, there being an even number of wheels in each set; an axle extending between all of the wheels of each set; a mounting member on each axle intermediate the extremities thereof; a rocking member extending at right angles to said axle and parallel to the axis of said truck; a stub shaft on said rocking member upon which said mounting member is rotatably mounted; pedestal means extending downward from said vehicle; means for tiltably mounting said rocking member intermediate its extremities on said pedestal means so that it will project both forwardly and rearwardly thereof; a hydraulic cylinder hingedly depending from said vehicle over the free extremity of each of said rocking members; a piston in each of said cylinders; a piston rod extending from said piston to the free extremity of said rocking member; and a cylinder head closing said cylinder about said piston.

4. A wheel mounting for multiple wheel vehicles comprising: a plurality of sets of wheels, there being an even number of wheels in each set; an axle extending between all of the wheels of each set; a mounting member on each axle intermediate the extremities thereof; a rocking member extending at right angles to said axle and parallel to the axis of said truck; a stub shaft on said rocking member upon which said mounting member is rotatably mounted; pedestal means extending downward from said vehicle; means for tiltably mounting said rocking member intermediate its extremities on said pedestal means so that it will project both forwardly and rearwardly thereof; a hydraulic cylinder hingedly depending from said vehicle over the free extremity of each of said rocking members; a piston in each of said cylinders; a piston rod extending from said piston to the free extremity of said rocking member; a cylinder head closing said cylinder about said piston; and fluid conduits communicating between all of said cylinders below the pistons therein to equalize the pressure below all of said pistons.

5. A wheel mounting for multiple wheel vehicles comprising: a plurality of sets of wheels, there being an even number of wheels in each set; an axle extending between all of the wheels of each set; a mounting member on each axle intermediate the extremities thereof; a rocking member extending at right angles to said axle and parallel to the axis of said truck; a stub shaft on said rocking member upon which said mounting member is rotatably mounted; pedestal means extending downward from said vehicle; means for tiltably mounting said rocking member intermediate its extremities on said pedestal means so that it will project both forwardly and rearwardly thereof; a hydraulic cylinder; a piston in said cylinder; means for transmitting the down-thrust of the free extremity of the rocking member to said piston, a conduit connecting the cylinders of the sets of wheels together so as to equalize the pressure in all cylinders; breather ports in said cylinders above said pistons; and breather tubes inter-connecting the breather ports of all of said cylinders.

6. A wheel mounting for multiple wheel vehicles comprising: a plurality of sets of wheels, there being an even number of wheels in each set; an axle extending between all of the wheels of each set; a mounting member on each axle intermediate the extremities thereof; a rocking member extending at right angles to said axle and parallel to the axis of said truck; a stub shaft on said rocking member upon which said mounting member is rotatably mounted; pedestal means extending downward from said vehicle; means for tiltably mounting said rocking member intermediate its extremities on said pedestal means so that it will project both forwardly and rearwardly thereof; a hydraulic cylinder; a piston in said cylinder; means for transmitting the down-thrust of the free extremity of the rocking member to said piston, a conduit connecting the cylinders of the sets of wheels together so as to equalize the pressure in all cylinders; a hydraulic fluid reservoir; and pumping means for pumping fluid from said reservoir into all of said cylinders.

7. A vehicle comprising: a chassis; a pair of wheel beams extending longitudinally of said chassis at one side thereof; a similar pair of wheel beams at the other side thereof; pedestal members extending downwardly from each pair of beams in spaced relation along their length, said members being in lateral alignment across said chassis; a rocking member tiltably mounted on each pedestal member and extending forwardly and rearwardly thereof; hydraulic cylinders; hinge members supporting said hydraulic cylinders between the pairs of wheel beams, there being one cylinder over the forward extremity of each of the rocking members; a piston in each of said cylinders; a piston rod extending from said piston to a hinged connection with the forward extremity of the adjacent rocking member; a mounting member rotatably mounted on the rearward extremity of each rocking member; a wheel shaft extending outwardly from both sides of said mounting member; wheels mounted on the wheel shafts at each side of the mounting member thereon; and means for supplying hydraulic fluid to said cylinders.

8. A vehicle comprising: a chassis; a pair of wheel beams extending longitudinally of said chassis at one side thereof; a similar pair of wheel beams at the other side thereof; pedestal members extending downwardly from each pair of beams in spaced relation along their length, said members being in lateral alignment across said chassis; a rocking member tiltably mounted on each pedestal member and extending forwardly and rearwardly thereof; hydraulic cylinders; hinge members supporting said hydraulic cylinders between the pairs of wheel beams, there being one cylinder over the forward extremity of each of the rocking members; a piston in each of said cylinders; a piston rod extending from said piston to a hinged connection with the forward extremity of the adjacent rocking member; a mounting member rotatably mounted on the rearward extremity of each rocking member; a wheel shaft extending outwardly from both sides of said mounting member; wheels mounted on the wheel shafts at each side of the mounting member thereon; fluid conduits connecting the cylinders along each pair of wheel beams into series with each other; a fluid supply device; and valves connecting said supply device with the conduits along each pair of wheels.

9. A wheel mounting for multiple wheel vehicles comprising: a plurality of sets of wheels, there being an even number of wheels in each set; an axle extending between all of the wheels of each set; a mounting member on each axle intermediate the extremities thereof; a rocking member extending at right angles to said axle and parallel to the axis of said truck; a stub shaft on said rocking member upon which said mounting member is rotatably mounted; pedestal means extending downward from said vehicle; means for tiltably mounting said rocking member intermediate its extremities on said pedestal means so that it will project both forwardly and rearwardly thereof; a hydraulic cylinder; a piston in said cylinder; means for transmitting the down-thrust of the free extremity of the rocking member to said piston, a conduit connecting the cylinders of the sets of wheels together so as to equalize the pressure in all cylinders; breather ports in said cylinders above said pistons; breather tubes inter-connecting the breather ports of all of said cylinders; and an air cleaner positioned at the intake of said breather tubes.

GEORGE V. PEARSON.